United States Patent [19]

Thompson

[11] Patent Number: 4,629,598

[45] Date of Patent: * Dec. 16, 1986

[54] METHOD FOR FORMING PLASTIC BOTTLE WITH INTEGRAL HANDLE

[75] Inventor: Mortimer S. Thompson, Arlington, Mass.

[73] Assignee: Tri-Tech Systems International, Inc., West Springfield, Mass.

[*] Notice: The portion of the term of this patent subsequent to Jul. 28, 1998 has been disclaimed.

[21] Appl. No.: 643,653

[22] Filed: Aug. 23, 1984

Related U.S. Application Data

[60] Division of Ser. No. 458,369, Jan. 17, 1983, abandoned, which is a continuation-in-part of Ser. No. 237,081, Feb. 23, 1981, Pat. No. 4,372,454, which is a division of Ser. No. 28,886, Apr. 10, 1979, Pat. No. 4,280,859, which is a continuation of Ser. No. 877,603, Feb. 14, 1978, abandoned.

[51] Int. Cl.$^4$ .................... B29C 49/06; B29C 49/12
[52] U.S. Cl. .................... 264/537; 215/1 C; 215/100 A; 264/523; 264/532; 425/525
[58] Field of Search ........... 264/520, 521, 523–543; 425/525; 215/1 C, 100 A; 220/94 A

[56] References Cited

U.S. PATENT DOCUMENTS

| 3,115,682 | 12/1963 | Soubier et al. ............ 264/515 X |
| 3,163,544 | 12/1964 | Valyi ........................ 215/1 C X |
| 3,900,120 | 8/1975 | Sincock .................... 215/1 C |
| 4,164,298 | 8/1979 | Nishikawa et al. ....... 264/521 X |
| 4,280,859 | 7/1981 | Tompson ................... 264/515 X |

FOREIGN PATENT DOCUMENTS

| 1912249 | 9/1970 | Fed. Rep. of Germany ...... 425/525 |
| 1192475 | 10/1959 | France .............................. 425/525 |

Primary Examiner—Jan Silbaugh
Attorney, Agent, or Firm—Hedman, Gibson, Costigan & Hoare

[57] ABSTRACT

A plastic bottle (10) formed from a preform (30) preferably having an unexpanded long neck (15) with the configuration and dimensions of the finished bottle (10) and an unexpanded handle (16) integral with and extending from the neck (15). The handle (16) includes a support ring (13) integral with the lower end of the neck (15) and an L-shape projection (22 and 24) extending therefrom. The bottle (10) also has an expanded portion (14 and 40) below the ring (13) including a recess (29) which centrally positions the handle (16) to facilitate lifting, carrying and pouring. In forming the bottle (10) in a preferred blow molding embodiment of the invention, the neck (15) remains constant in size while the handle support ring (13) positions and restricts movement of the preform (30) and the expandable portion (38) is blown to form the desired expanded shoulder and body (14 and 40).

4 Claims, 6 Drawing Figures

METHOD FOR FORMING PLASTIC BOTTLE WITH INTEGRAL HANDLE

This is a divisional application of Ser. No. 458,369, filed on Jan. 17, 1983, now abandoned, which is a continuation-in-part application of Ser. No. 237,081, filed Feb. 23, 1981, now U.S. Pat. No. 4,372,454, issued Feb. 8, 1983, which is a divisional application of Ser. No. 28,886, filed Apr. 10, 1979, now U.S. Pat. No. 4,280,859, issued July 28, 1981, which is a continuation of Ser. No. 877,603, filed Feb. 14, 1978, now abandoned.

FIELD OF THE INVENTION

This invention relates to plastic bottles with integral handles and to a method for forming the bottles with integral handles in which the handles facilitate the manufacture of the containers or bottles.

BACKGROUND OF THE INVENTION

While plastic bottles with handles, particularly larger bottles of 32 ounces and larger, are widely used they have drawbacks in manufacture and in use.

With respect to plastic bottles with handles for lifting, carrying and pouring, they generally are made by the extrusion blow molding process from materials which include polyethylene and polyvinyl chloride.

In an extrusion blow-molding process an extruder initially forms large diameter preforms, hollow tubes known as parisons, and the parisons while at fusion temperatures, are positioned within blow molds having the desired final shape of the bottles. In each blow mold a portion of the parison is pinched off to form a handle shape, and the pinched parison is blown to its final bottle dimensions with a hollow handle and an interconnecting web. Thereafter, the web is removed to provide a handle for gripping, lifting, carrying and pouring.

However, the extrusion and other blow molding methods which result in bottles with hollow handles have shortcomings. In forming the hollow handles, relatively high plastic temperatures and substantial parison thickness are required to provide satisfactory fusion in the pinched and blown parison. Also the parison must have a large enough diameter so that it will essentially traverse the breadth of the bottle when pinched and blown. In addition, decreasing the amount of plastic used to form the bottles, known as "light weighting", is limited in many cases by the need for adequate parison thickness to provide the requisite fusion along the extensive pinched off areas. Another limitation is that the required large diameter parison produces bottles having wide variations in wall thicknesses, especially at and near the sidewall at the bottom juncture and at the shoulder area—the most vulnerable areas to drop impact and denting forces. This results because the pinch off distributes the parison into thick areas at each end of the pinch off and in very thin areas in the blown bottle at right angles to it.

Still another important limitation is that the relatively high fusion temperatures required to form the pinched off, hollow handles cannot be used to form handles in the newer orientation blow-molding process for forming plastic bottles. This process differs from the hollow handle, blow-molding process in that the parison is stretched and blown while at temperatures which are much lower than the fusion temperatures, generally within the 100° F. range above $T_c$ (the temperature at which the plastic material passes from the glass phase to the rubber phase). This procedure is known as stretch-blow molding or orientation-blow molding.

The problem with producing plastic containers with handles using the stretch-blow processes results from the nature of the process and condition of the plastic at the time it is biaxially oriented. First, it is not possible to produce handles by the aforementioned parison pinch-off technique because the plastic temperature required for suitable molecular orientation is much too low to permit adequate fusion of the plastic. To initially form the handle at elevated temperatures and then to cool to biaxial orientation temperatures before stretching and blowing would yield unoriented handles, and substantial other portions of the container, with inferior containment and other properties. Further, the large diameter parison required for the parison pinch-off technique reduces the amount of desired biaxial orientation in all portions of the bottle.

In addition to the foregoing, specific problems arise when utilizing the injection stretch blow molding method for producing bottles with long narrow necks and substantially expanded bodies, such as those which may be used for distilled spirits and wine. These bottles typically consist of a neck finish for engaging a cap, a short transition zone, an expanded neck portion, and expanded shoulder and body portions. The transition zone provides a necessary transition from bottle nonexpanded to expanded portions and is typically less than $\frac{1}{2}$ inch. In forming these bottles the blow up ratio for the expanded neck portion is very low when compared to the blow up ratio for the body. Consequently, provisions must be made to avoid what would otherwise result in excessively thick, heavy and, therefore, costly wall thickness in the neck portion. These provisions may include higher plastic temperatures in the preform portion which will form the bottle neck portion than those used for the more fully expanded body portions. With such provisions the rheology of the plastic is controlled so that it will stretch and thin out more in the neck areas. This, however, is an induced result and, therefore, its success depends on the degree to which such provisions can approach the ideal which will produce the desired results. These conditions in commercial practice are generally far from ideal even for so called close process control systems. Therefore, there exists a need for manufacturing methods which can produce long narrow bottle necks, such as are desired attachment sites for handles, without resulting in excessively thick, heavy and costly wall thickness.

Thus, there is a need for new and improved bottles with handles and for new and improved methods for forming such bottles and in particular a need for pouring handles using a three to four finger grip which can be located close to the bottles' centers of gravity and which can be manufactured without costly excessive weight or process procedures or controls.

SUMMARY OF THE INVENTION

In accordance with the present invention there is provided a new and unique bottle with an integral handle. In a preferred embodiment the bottle is blow molded and formed from a preform having, in depending order, a neck finish, a generally long, rigid and non-expanded neck portion, a short temperature transition zone and an expandable lower portion. The handle includes a ring integral with and extending substantially about the lower end of the unblown neck portion, and an integral projection which extends from and depends downwardly from the ring. Below the ring the preform includes a short transition zone followed by an expandable portion which is blow molded to form the body of the bottle, including a recess extending from below the ring and opposite the downwardly extending portion of the projection. The projection forms the upper and outer portions of the recess and is positioned substantially within the breadth of the bottle. The projection from the ring preferably has an L-shape with a generally horizontal leg integral with the ring at its inner end and a generally vertical leg depending from the outer end thereof. The lower end of the vertical leg can be attached to or free of the fully blown portion of the bottle. In both embodiments, the handle is significantly more centrally located on the bottle and therefore closer to its center of gravity.

As mentioned, the lower end of the handle can be affixed to the blown portion of the bottle, such as by mechanical engaging means, welding means or a simple pressure engagement. Also, the lower end of the handle can be unattached and spaced above the bottom of the recess.

In use the generally vertical leg of the handle is gripped by one or more fingers extending through the recess and the bottle is lifted and carried and readily poured from because the handle is preferably positioned relatively close to the center of gravity of the bottle.

The plastic bottles of the invention can be produced by extrusion blow molding, extrusion-stretch blow molding, injection blow molding, and injection-stretch blow molding using polyolefins, polyethylene terephthalate (PET), polyvinyl chloride, acrylonitrile polymers, and other polymers suitable for food, beverage, wine, liquor, chemical and cosmetic uses.

In one method for forming the plastic bottles of the invention a preform is formed which includes an upper neck finish for a cap, a generally long, rigid and non-expanded intermediate neck portion, a short temperature transition zone and an expandable lower portion. Thereafter the preform is placed in a mold in which only the lower portion is expanded, and preferably biaxially oriented, to provide the expanded shoulder and body portions of the bottle below the non-expanded neck finish and neck. As stated, this is accomplished in accordance with the method of the invention by blowing only the body portion and not the neck portion. This process assures the attainment of the desired thin and uniform wall thickness in the neck by relying on the positive placement of molten plastic material in a closed injection mold rather than by the indirect and imperfect means offered by blow-molding such portions.

In a preferred method, the preform of the invention is initially formed with the desired neck portion and integral support ring and handle. Then the preform is placed in a blow mold with the ring properly locating and restricting the movement of the preform in the mold. Thereafter, the positioned preform is expanded only below the ring, beginning at the short preform temperature transition zone to form the lower expanded body portions of the bottle.

In this invention, the lower portions of the bottle can be expanded and have a wide variety of configurations while the ring and the neck are not expanded at all. Illustratively, the unexpanded neck portion can be tubular and have a taper of 5 degrees or less, and include raised or recessed portions to provide decorative or functional effects and its length can be from 1 to 6 inches.

Thus, the present invention provides new and unique containers or bottles with the described integral handles and new and unique methods for forming the containers and bottles.

DESCRIPTION OF THE ILLUSTRATIVE EMBODIMENTS OF THE INVENTION

The following is a detailed description together with accompanying drawings of the invention. It is to be understood that the invention is capable of modification and variation apparent to those skilled in the art within the spirit and scope of the invention.

Figure 1:
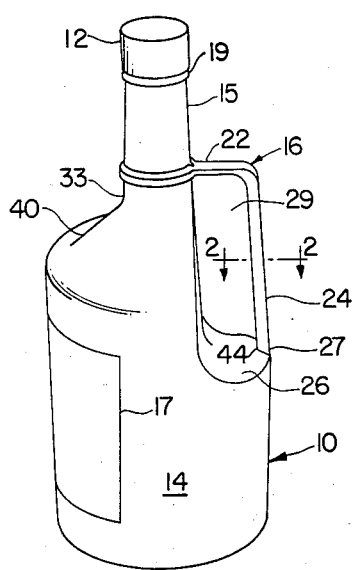
FIG. 1 is a side perspective view of a bottle and integral handle of the present invention suitable for distilled spirits.
Figure 3:
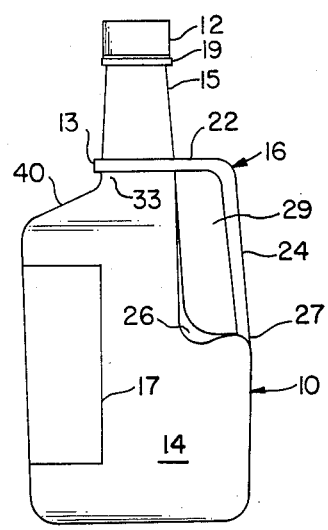
FIG. 3 is a side elevational view of the bottle of FIG. 1.

Referring now to FIGS. 1 and 3, there is shown a plastic distilled spirits bottle 10 and integral handle 16 of the present invention. The bottle 10 includes a tubular tapered unblown neck 15 with a neck finish 42 (FIG. 4) for a cap 12 and a neck ring 19 which abuts the cap 12 at the upper end of the neck 15. At the lower end of the neck 15 there is a support ring 13 and a transition zone 33 therebelow. The zone 33 divides the described unexpanded and the expanded bottle portions. In this embodiment the expanded portions include a tapered shoulder 40 depending from the transition zone 33 and a cylindrical body portion 14. On the front of the bottle 10 is a label 17 and on the opposite side is a recess 29.

The handle 16 has an L-shape and is not expanded. The handle 16 includes a horizontal leg 22 integral with and extending from the support ring 13 and an outer depending vertical leg 24 whose lower end 27 slidably fits in a depression 44 in the bottom 26 of the recess 29.

The recess 29 is part of the expanded portion of the bottle 10 and extends from below the neck 15 through the shoulder 40 and into the bottle body 14. As shown, the recess 29 allows the L-shape handle 16 to be located close to the center of gravity of the filled bottle 10. Further, and as also shown, the neck portion 15 is relatively long and allows the handle 16 to be located more centrally on the bottle 10 and, therefore, even closer to its center of gravity for pouring ease. Typically, bottle 10 can be about 10 inches to 16 inches in height with relatively long necks of about 2 inches to 6 inches. As shown, moreover, the handle projection 16 forms the top and outer portion of the recess 29 within the breadth of the bottle body 14 which is typically from about 4 inches to about 6 inches in diameter.

Figure 2B:
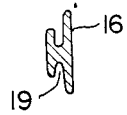
FIG. 2B is another cross sectional configuration for the cross section of the handle projection of FIG. 1.
Figure 2A:
FIG. 2A is one embodiment of the cross sectional configuration of the handle projection of FIG. 1.

The projection 16 has a curved plate cross section as shown in FIG. 2A to provide a more comfortable grip, but importantly also to permit a minimal thickness to allow for rapid set-up during molding the preform, to thereby, provide the required resilient properties. This is important for in-line orientation blow molding processes (where the preform is rapidly quenched in an injection mold and indexed to a temperature conditioning station for the blow molded portion prior to orientation blow molding) so that the projection 16 will have structural integrity during subsequent operations. FIG. 2B shows the cross section of another embodiment of the handle projection 16 which provides a comfortable grip and rapid cooling which is created by the grooves 19.

In this embodiment the non-blown segment of the bottle 10 includes the neck finish 42, the neck portion 15, and the handle 16. This segment does not change in size after initial formation in a preform. Only a portion of the transition zone 33 and the shoulder and body portions 40 and 14 of the preform are expanded.

Figure 4:
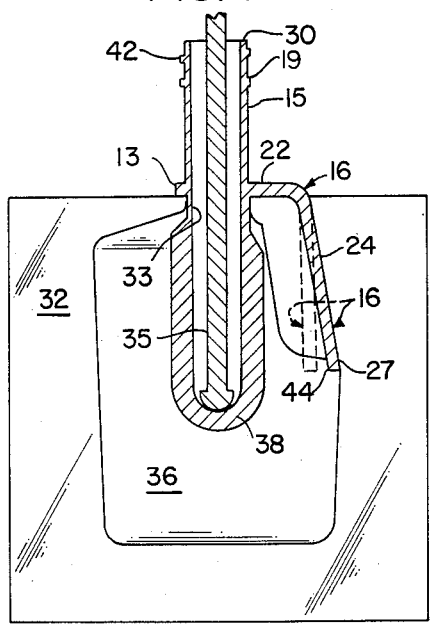
FIG. 4 is a cross sectional view of the preform for the bottle of FIG. 1 prior to stretch blow molding, wherein the bottle is shown in the open blow mold half with an L-shape handle projection prior to insertion in the mold shown in phantom.

FIG. 4 shows a preferred method whereby the bottle 10 of FIGS. 1 to 3 is produced by injection-stretch blow molding. The preform 30, shown in cross section, includes a neck finish 42 for the cap 12, the support ring 13, the neck portion 15, the L-shaped handle projection 16, the temperature transition zone 33 and an expandable lower portion 38. As illustrated, the transition zone 33 and expandable lower portion 38 are positioned in a blow mold half 32 which includes a cavity 36. Located within preform 30 is a stretch rod 35.

The preform 30 is produced in an injection mold with the handle projection 16 configuration as shown in phantom. After a conditioning period to bring the expandable lower preform portion 38 to orientation temperature, the preform 30 is then positioned in the blow mold 32 so that the support ring 13 buttresses against its upper surface and the handle projection 16 is flexed outwardly so that its lower end 27 becomes a part of the mold cavity surface. Only the preform lower portion 38 is then stretched longitudinally using the stretch rod 35 and immediately blown by pressurized air to take on the configuration of the mold cavity 36. Alternatively, the stretch rod 35 need not be employed and the expandable lower preform portion 38 is allowed to stretch freely in both vertical and horizontal directions. In another alternative (not shown) the handle projection 16 is flexed outwardly so that its extremity 27 is positioned beyond the confines of the blow mold cavity 36 and does not represent a part of the surface of the mold cavity 36. In this instance depression 44 is shaped by the mold cavity 36 proper and upon removal of the bottle 10 from the blow mold 32 the projection extremity 27 slides forcibly into depression 44.

As shown in FIG. 4, the generally vertical leg 24 of the handle 11 normally is at about a 90° angle to the horizontal leg 22, and the end 27 of the leg 24 and the depression 44 have complementary shapes for engagement therebetween. To achieve this engagement the leg 24 is adapted to be flexed outwardly in the mold 32. This places the handle 16 under the required tension along its full length and maintains engagement between the leg end 27 and the bottle 10 within the depression 44 after molding.

In addition, the lower end of the generally vertical leg 24 can be attached to the bottle 10 at the recess end 26 by other means including the interlocking mechanical engaging means or the welding and bonding means of my U.S. Pat. No. 4,280,859, the disclosure for which is incorporated herein by reference.

In each of these described embodiments, moreover, the neck finish 42, support ring 13, neck portion 15, and the L-shape handle projection 16 are not blow molded and remain constant in size after being formed. Only the transition zone 33 and the lower portion 38 are expanded by blow molding in the mold 32. Accordingly, the present invention assures the attainment of the desired thin and uniform wall therebetween in the neck portion 15 by relying on the postive placement of molten plastic material in a closed injection mold prior to placing the preform 30 in the mold 32.

Figure 5:
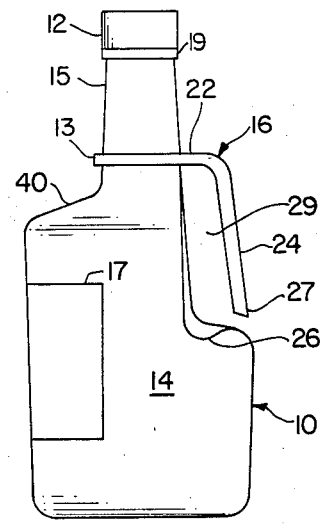
FIG. 5 is a side elevational view of another distilled spirits bottle of the present invention.

In FIG. 5, there is shown another integral handle 16 of the present invention which includes an L-shape projection wherein the vertical leg 24 is unattached at its lower end. The lower end of the handle 16 is free and spaced above the bottom 26 of the recess 29 but the handle 16 is not unduly deflected because it is relatively close to the center of gravity of the bottle 10. As a result, lifting, carrying and pouring from the bottle 10 is greatly facilitated.

The plastic bottles of the invention can be produced by injection blow-molding and injection-stretch blow molding or other methods using polyolefins (e.g., polyethylene and polypropylene) polyethylene terephthalate (PET), polyvinyl chloride, acrylonitrile polymers and other polymers suitable for food, beverage, wine, liquor, chemicals, toiletries and cosmetic uses.

Moreover, a wide variety of body styles can be used for the bottle depending, inter alia, on their intended use. For example, the neck 15 can be short instead of long, e.g., extending only from about 1.5 inches to about 3 inches.

As described, the process of the invention includes a blowing step in which a preform is expanded to conform with a mold. The preferred type of blowing operation results in biaxial orientation of polymer molecules. Biaxial orientation occurs over a range of temperatures within which some part of the stress applied during blowing produces strain in the polymer. It has been indicated that this requirement is met in many polymer materials if blowing is carried out within a finite temperature range above $T_c$. For these purposes, $T_c$ is assigned its conventional meaning of the temperature representing the transition from the glass phase to the rubber phase produced upon heating of the polymer. An acceptable range for biorientation—i.e., for stretch blow molding in the usual case, does not exceed 100° F. above $T_c$. To a significant extent, the degree of biaxial orientation and, in consequence, the improvement in physical properties attendant upon this parameter increases for a given degree of expansion as temperature is decreased. A significant improvement in properties is generally found to result in those procedures in which the average wall thickness is reduced by a factor of at least two, while the plastic is at a temperature within 100° F. or preferably 50° F. above $T_c$. This is considered to be preferred from the standpoint of stretch blow molding, per se, and in similar fashion is considered to define a preferred embodiment in accordance with the invention.

In the practice of the invention the handles preferably are not integral with the expanded biaxially oriented body portions of the bottles. This optimizes the amount of surface area of the body portions which can be biaxially oriented.

Also, in accordance with the invention, a preform (or parison) is provided with the described integral handle generally of the same material of which the parison is constructed. In the preferred embodiment, the handle is the result of a unitary molding operation—generally, an injection molding operation.

As seen from the drawings, the projection, eventually to serve as a handle, expeditiously can be attached at a thickened region or ring ultimately to serve as a gripping section for subsequent blow molding. The thickened portion generally required for the blow molding operation offers the additional structural integrity desired for a stress point resulting from handle usage. Such gripping sections commonly are essentially outside of the main section of the blow mold and the blown container shape and/or size is essentially unaffected by the inclusion of the handle.

With respect to terms herein, they have been used in their conventional sense. Some of the terms used in the description are briefly defined:

Plastic: a category of organic materials, generally thermoplastic, substituted or unsubstituted, hydrocarbons—examples are polyolefin, such as polypropylene, and polyesters, such as polyethylene terephthalate.

$T_c$: (glass transition) temperature at which the plastic changes from a glassy state to a rubbery state. Molding operations are invariably carried out substantially above $T_c$—generally at temperatures at least 100° F. in excess. Preferred embodiments herein which depend upon biaxial orientation are carried out with the plastic in the rubbery state but over a lower range, generally within 100° F. of $T_c$.

Molding: that category of procedures in which plastic material is caused to flow into the interstices of the mold to result in a formed object which becomes rigid upon cooling.

Preform: (occasionally referred to as parison) the molded form which, in the procedure of the invention, is formed preliminary to expansion to produce the final object and, therefore, a form somewhat smaller than that of the final object. As generally contemplated, the preform is produced with the plastic at an elevated temperature in excess of 100° F. above $T_c$.

Injection molding: that molding procedure generally utilized to produce the preform. In the usual commercial process, plastic materials introduced as particulate matter by a screw or ram with or without external heating is brought to elevated temperature so that it is introduced as a flowing plastic under pressure into a mold to produce the preform. Connecting passages known as runners are common.

Compression or Transfer molding: one of the more common alternatives to injection molding to produce the handle in which a mass of plastic is heated and is introduced into a mold portion. Whereafter, an additional mold portion, such as a plunger, distorts the mass to cause it to conform, again, with the interstices of the now completed mold.

Blow molding: this term contemplates expansion of the preform to its final configuration by the use of gas under pressure. This requires the use of a blow mold. As practiced conventionally, no effort is made to change the temperature of the preformed plastic before or during the blowing operation. Some reduction in temperature naturally results from contact with the preform mold.

Stretch blow molding: blow molding in which the preform is stretched longitudinally often by means of an inserted plunger prior to blowing. The procedure is recognized as advantageously practiced with the plastic material within a temperature range close to but above $T_c$ so as to result in extension of the polymer molecules from their natural state to an extended state with the major molecular axis as resolved lying in the direction of stretch. Blowing is carried out within the same temperature range designed to result in retained orientation in the blow direction so that the resulting final configuration is "biaxially oriented".

The invention in its broader aspect is not limited to the specific described embodiments and departures may be made therefrom within the scope of the accompanying claims without departing from the principles of the invention and without sacrificing its chief advantages.

I claim:

1. A method for forming a plastic bottle, comprising:
    forming a preform from plastic having a neck of the finished bottle, an expandable portion below the neck, and an integral handle including a ring which is integral with and extends about the lower end of the neck, and a projection which extends outwardly and downwardly from the ring adapted to be relatively close to the center of gravity of the finished bottle to facilitate lifting, carrying and pouring and for distributing the stresses resulting therefrom about said ring,
    placing the preform in means for expansion and holding said ring by such means to properly locate and restrict the movement of the preform therewithin, and
    expanding the portion below the ring to a breadth substantially greater than the breadth of the neck to thereby form the body of the plastic bottle.

2. The method of forming the plastic bottle of claim 1, wherein the plastic of the bottle is biaxially orientable, and the portion below the neck is expanded to form a biaxially oriented body.

3. The method of forming the plastic bottle of claim 1, wherein the plastic is polyethylene terephthalate and the portion below the ring is expanded to form a biaxially oriented polyethylene terephthalate body.

4. The method of forming the bottle of claim 1, comprising injection molding the plastic to form the preform.

* * * * *